United States Patent
Doong et al.

(10) Patent No.: US 8,936,669 B2
(45) Date of Patent: Jan. 20, 2015

(54) TEMPERATURE SWING ADSORPTION SYSTEMS AND METHODS FOR PURIFYING FLUIDS USING THE SAME

(71) Applicant: UOP LLC, Des Plaines, IL (US)

(72) Inventors: Shain-Jer Doong, Kildeer, IL (US); Christopher B. McIlroy, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 157 days.

(21) Appl. No.: 13/887,837

(22) Filed: May 6, 2013

(65) Prior Publication Data

US 2014/0326136 A1    Nov. 6, 2014

(51) Int. Cl.
  *B01D 53/04*    (2006.01)
  *B01D 53/22*    (2006.01)

(52) U.S. Cl.
  CPC ...... *B01D 53/0462* (2013.01); *B01D 2259/416* (2013.01); *B01D 2259/404* (2013.01); *B01D 2253/106* (2013.01); *B01D 2256/245* (2013.01); *B01D 53/229* (2013.01)
  USPC ................. 95/115; 95/148; 96/122; 96/126; 96/127; 96/142; 96/146

(58) Field of Classification Search
  CPC .. B01D 53/04; B01D 53/0462; B01D 53/229; B01D 2253/106; B01D 2256/245; B01D 2259/404; B01D 2259/416
  USPC .............. 95/114, 115, 139, 148; 96/121, 122, 96/126–128, 130, 134, 142, 143, 146
  See application file for complete search history.

(56) References Cited

U.S. PATENT DOCUMENTS

| | | | |
|---|---|---|---|
| 3,733,775 A | 5/1973 | Barrere | |
| 4,233,038 A | 11/1980 | Tao | |
| 4,336,159 A | 6/1982 | Winter | |
| 4,770,676 A * | 9/1988 | Sircar et al. | 95/99 |
| 4,971,606 A | 11/1990 | Sircar et al. | |
| 5,089,034 A * | 2/1992 | Markovs et al. | 95/99 |
| 5,779,768 A | 7/1998 | Anand et al. | |
| 7,311,758 B2 * | 12/2007 | Thomas et al. | 95/122 |
| 8,226,746 B2 | 7/2012 | Dunne et al. | |
| 8,778,050 B2 * | 7/2014 | Dolan et al. | 95/96 |
| 2003/0037672 A1 * | 2/2003 | Sircar | 95/96 |
| 2007/0240449 A1 | 10/2007 | Howard et al. | |
| 2009/0308247 A1 | 12/2009 | Knaebel | |
| 2011/0315010 A1 | 12/2011 | Doong et al. | |

FOREIGN PATENT DOCUMENTS

EP            0523929 B1    9/1996

* cited by examiner

*Primary Examiner* — Frank Lawrence

(57) ABSTRACT

A temperature swing adsorption system includes a first adsorption bed configured to receive a feed stream and adsorb a contaminant from the feed stream to produce a product stream, a second adsorption bed configured to receive a portion of the product stream and a cooling stream to reduce a temperature of the second adsorption bed, a third adsorption bed configured to receive the heated product stream to increase a temperature of the third adsorption bed; a separation system to separate the cooled product stream into a first component stream and a second component stream, and a fourth adsorption bed configured to receive the first component stream and to enrich an adsorptive concentration of the first component stream. The enriched first component stream is directed to the second adsorption bed to provide the cooling stream.

20 Claims, 3 Drawing Sheets

TEMPERATURE SWING ADSORPTION SYSTEMS AND METHODS FOR PURIFYING FLUIDS USING THE SAME

TECHNICAL FIELD

The present disclosure generally relates to fluid separation systems and methods for processing fluids in fluid separation systems. More particularly, the present disclosure relates to temperature swing adsorption systems and methods for purifying fluids using temperature swing adsorption systems.

BACKGROUND

Temperature swing adsorption (TSA) units are used in a variety of industries to remove contaminants from fluids, such as liquids and gas streams. TSA is a batch-wise process consisting of two basic steps: adsorption and regeneration. In the adsorption step, contaminants or other impurities are removed from the fluid by adsorption onto a solid adsorbent material and then the treated stream leaves the unit with lowered contaminant levels. In the regeneration step, the adsorbed contaminants are desorbed from the solid adsorbent material by means of a regeneration stream (typically a gas stream).

The regeneration step includes two major parts: heating and cooling. In the heating part of the process, the regeneration stream is heated to an elevated temperature and caused to flow over the solid adsorbent material. Due to the heat of the gas and the difference in partial pressure of the contaminants on the solid adsorbent material and in the regeneration gas stream, the contaminants desorb from the solid material and leave the unit with the regeneration gas. A cooling step is then necessary to condense the contaminant. In the case that the desorbed contaminants in the regeneration gas cannot be removed by condensation (such as $CO_2$ removal), other separation means are employed to separate the contaminants from the regeneration gas, such as membrane or solvent absorption separation. The cooled regeneration gas, which is saturated with the contaminants, can then be recycled to the feed in a closed-loop mode to minimize the loss of the regeneration gas. Alternatively, in an open-loop regeneration mode, the effluent regeneration gas can be disposed of as a fuel gas or by venting instead of returning to the feed stream.

Hence, the most basic form of a TSA process unit consists of two vessels, with one vessel in adsorption mode and the other vessel in regeneration mode. However, depending on the quantity of feed material to be treated as well as the amount of contaminants to be removed from the feed stream, several vessels, which operate in a parallel mode, or in alternating sequences, could be required. In a more complicated form of operation, the regeneration step can also be split over two vessels in a series-heat-and-cool cycles, where one of the vessels would be in the heating step and another would be in the cooling step.

Regardless of whether the system operates in a closed-loop or an open-loop regeneration mode, it is always desirable to have concentrated contaminants in the regeneration gas. Such operation can improve the separation efficiency for the contaminant removal by condensation or by other separation means (such as membrane or solvent absorption separation). Stated conversely, it is more difficult for the contaminants to be removed from a regeneration gas stream with diluted contaminants. As a consequence, the majority of the contaminants will be recycled back to the feed in the closed-loop mode. This mode of operation requires an increase the size of the adsorption unit. Consequently, a larger adsorption unit leads to an increasing regeneration flow. And, a higher regeneration flow through the system further dilutes the contaminant concentration, thus making it more difficult to condense or otherwise remove the contaminant in the cooled regeneration gas stream.

Accordingly, it is desirable to provide TSA systems and associated fluid purification methods that reduce the required regeneration gas flow and consequently reduce the size of the adsorption unit. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The present disclosure provides embodiments of temperature swing adsorption systems and methods for purifying fluids using temperature swing adsorption systems. In one embodiment, an exemplary temperature swing adsorption system includes a first adsorption bed configured to receive a feed stream and adsorb contaminants from the feed stream to produce a product stream, a second adsorption bed configured to receive a portion of the product stream and a cooling stream to reduce a temperature of the second adsorption bed and a heater configured to receive the portion of the product stream from the second adsorption bed and to increase a temperature of the portion of the product stream to generate a heated product stream. The system further includes a third adsorption bed configured to receive the heated product stream to increase a temperature of the third adsorption bed and desorb the said contaminants, a cooler configured to receive the heated product stream from the third adsorption bed and to decrease a temperature of the heated product stream to generate a cooled product stream, and a separation system to separate the cooled product stream into a first component stream and a second component steam enriched with the said contaminants. Still further, the system includes a fourth adsorption bed configured to receive the first component stream and to enrich an adsorptive concentration in the fourth adsorption bed. The product stream of the fourth adsorption bed is directed to the second adsorption bed to provide the cooling stream.

In another embodiment, an exemplary a temperature swing adsorption method includes receiving a feed stream into a first adsorption bed and adsorbing a contaminant from the feed stream into the adsorption bed to produce a product stream, receiving a portion of the product stream and a cooling stream into a second adsorption bed to reduce the temperature of the second adsorption bed, and receiving the portion of the product stream from the second adsorption bed into a heater to increase a temperature of the portion of the product stream to generate a heated product stream. The method further includes receiving the heated product stream into a third adsorption bed to increase a temperature of the third adsorption bed and desorb the said contaminants, receiving the heated product stream from the third adsorption bed into a cooler to decrease a temperature of the heated product stream to generate a cooled product stream, and separating the product stream in a separation system into a first component stream and a second component stream enriched with the contaminants. Still further, the method includes receiving the first component stream into a fourth adsorption bed to enrich an adsorptive concentration of the fourth adsorption bed and directing the product stream of the fourth adsorption bed to the second adsorption bed to provide the cooling stream.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The temperature swing adsorption systems and associated methods will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. All of the embodiments and implementations of the temperature swing adsorption systems and associated methods described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Embodiments of the present disclosure are directed to temperature swing adsorption systems and methods for purifying fluids using temperature swing adsorption systems. The embodiments employ a novel TSA "cycle" (i.e., method of operation) to reduce the regeneration gas flow and thus the required size of the adsorption unit. The described embodiments find particular application in systems wherein the contaminants are removed by condensation from the regeneration gas stream, as in many TSA applications, although other implementations are possible. Furthermore, for the particular example of the removal of hydrocarbons from a natural gas stream to prevent freezing during transport and processing of the liquefied natural gas (LNG) stream, the described embodiments offer significant benefits over prior art TSA cycles, as will be described in greater detail below.

In particular, it has been discovered that the contaminant concentration in the effluent regeneration gas can be raised by increasing the adsorbent loading prior to the bed regeneration step. In a typical TSA process, such as those practiced in the prior art, the maximum adsorbent loading is limited by the feed concentration of contaminant. Therefore, the loading will be low for feed streams with dilute contaminants. In a TSA process, the effluent regeneration stream generally has the highest concentration for the contaminant components to be removed. In the embodiments described herein, the effluent regeneration stream, after cooling and liquid separation, is recycled to the inlet end of the adsorption unit following the feed or adsorption step but prior to the hot regeneration step (i.e., the heating part noted above) so that the gas phase concentration in the adsorption unit can be increased. Consequently the adsorbent loading is increased as well. The increased adsorbent loading results in a further increase of the gas phase concentration of the contaminant during the subsequent regeneration step, thereby improving the efficiency of the TSA process.

Figure 1:
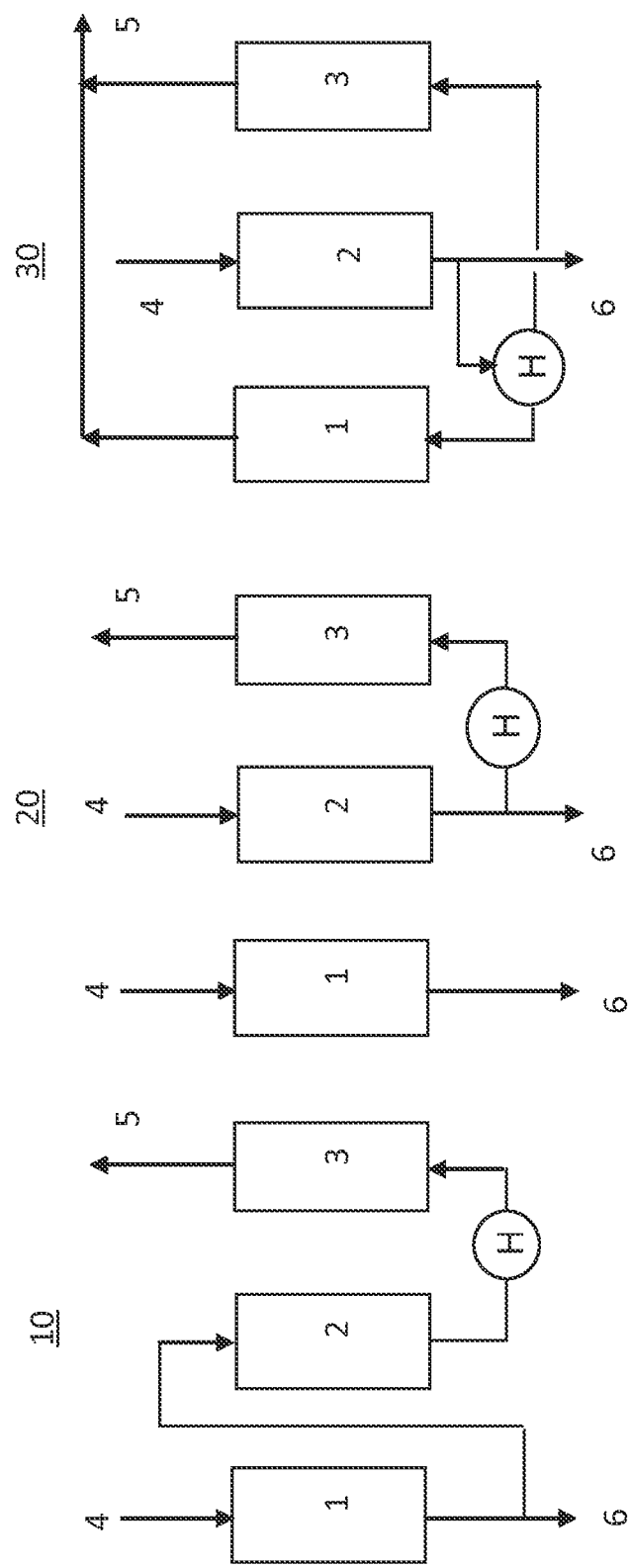
FIG. 1 is a process flow diagram illustrating a method implemented on a temperature swing adsorption system known in the prior art.

Reference is now made to FIG. 1, which illustrates a process diagram for a known TSA system currently employed in the art, which is set forth herein for purposes of comparison. As shown therein, the TSA process is divided into three discreet steps: step 10, step 20, and step 30. This particular prior art cycle uses co-current cooling followed by counter-current heating scheme.

As shown in FIG. 1, at step 10, feed gas 4 is sent to a first adsorption bed 1 to remove contaminants from the feed gas. The feed gas 4 is fed to the first adsorption bed 1 at a feed gas temperature that is preferably from about 15° C. to about 50° C., although other temperatures are possible. The first adsorption bed 1 contains an adsorbent material for carrying out a temperature swing adsorption process. Suitable adsorbent materials are well known to those skilled in the art and include natural and synthetic zeolites, activated carbon, silica gel, and alumina. A clean product stream 6 from the product end of the bed 1 is withdrawn. The clean product stream 6, substantially depleted of contaminants, is withdrawn leaving the contaminant substantially adsorbed on the adsorbent material in the first adsorption bed 1.

A small stream of the clean product is diverted for bed regeneration. This stream, after passing a compressor to boost its pressure (not shown), is sent to a second adsorption bed 2, in a direction co-current to the feed flow 4 to cool the second adsorption bed 2. The effluent stream from the second adsorption bed 2, after being heated in a heater (H), is sent to a third adsorption bed 3 in a direction counter-current to the feed flow 4 to heat bed 3. That is, the effluent stream from the second adsorption bed 2 is withdrawn therefrom and is sent to heater (H) (heater effluent temperature is greater than the temperature of the gas stream) where it is heated to form a hot regeneration gas at a hot regeneration gas temperature. The hot regeneration gas temperature will depend on the nature of the feed gas, the contaminant within the feed gas, and the type of adsorbent material and will generally be from about 100° C. to about 300° C. hotter than feed gas 4 temperature, although other temperatures are possible. The heater (H) is supplied with a means of providing heat to the entering gas stream. For example, the heater may include an electric heater, a steam heater, a fired heater, a hot oil heater, or other types of heater known in the art. The hot regeneration gas from the heater is sent to the third adsorption bed 3. The hot regeneration gas stream causes desorption of the contaminants from the adsorbent material in the third adsorption bed 3 and forms a regeneration gas effluent stream 5. The regeneration gas 5 is sent to an air cooler (not shown) for further processing, e.g. a gas-liquid separation process. In a closed-loop mode, this regeneration effluent gas stream 5 will return to feed stream 4.

As further shown in FIG. 1, at step 20, both adsorption bed 1 and adsorption bed 2 receive the feed gas 4 and undergo the adsorption step. A small stream of the clean product 6 is withdrawn and through a blower (not shown) and a heater, and is the sent to adsorption bed 3 for heating in a direction counter-current to the feed flow.

Still further, as shown in FIG. 1, at step 30, adsorption bed 2 continues receiving the feed gas in the adsorption step. A small stream of the clean product 6 is withdrawn for bed regeneration. This stream, after the heater (H), is split into two streams. One is sent to bed 3 and the other one to bed 1 in a direction counter-current to the feed flow to heat both beds. The operation of this conventional temperature swing adsorption system "cycles" between steps 10, 20, and 30 during the batch-wise operation of the system. Thus, each of the adsorption beds 1, 2, and 3 perform different functions, depending on the particular step of operation (10, 20, or 30) that is being performed at a particular point in the processing cycle.

TSA systems configured according to the prior art system shown in FIG. 1 suffer from several drawbacks. For example, the majority of the contaminants will be recycled back to the feed in the closed-loop mode. This mode of operation requires an increase the size of the adsorption unit. Consequently, a larger adsorption unit leads to an increasing regeneration flow. And, a higher regeneration flow through the system further dilutes the contaminant concentration, thus making it more difficult to condense or otherwise remove the contaminant in the cooled regeneration gas stream. Thus, it is clear that a more efficiently operating system is desirable.

Figure 2:
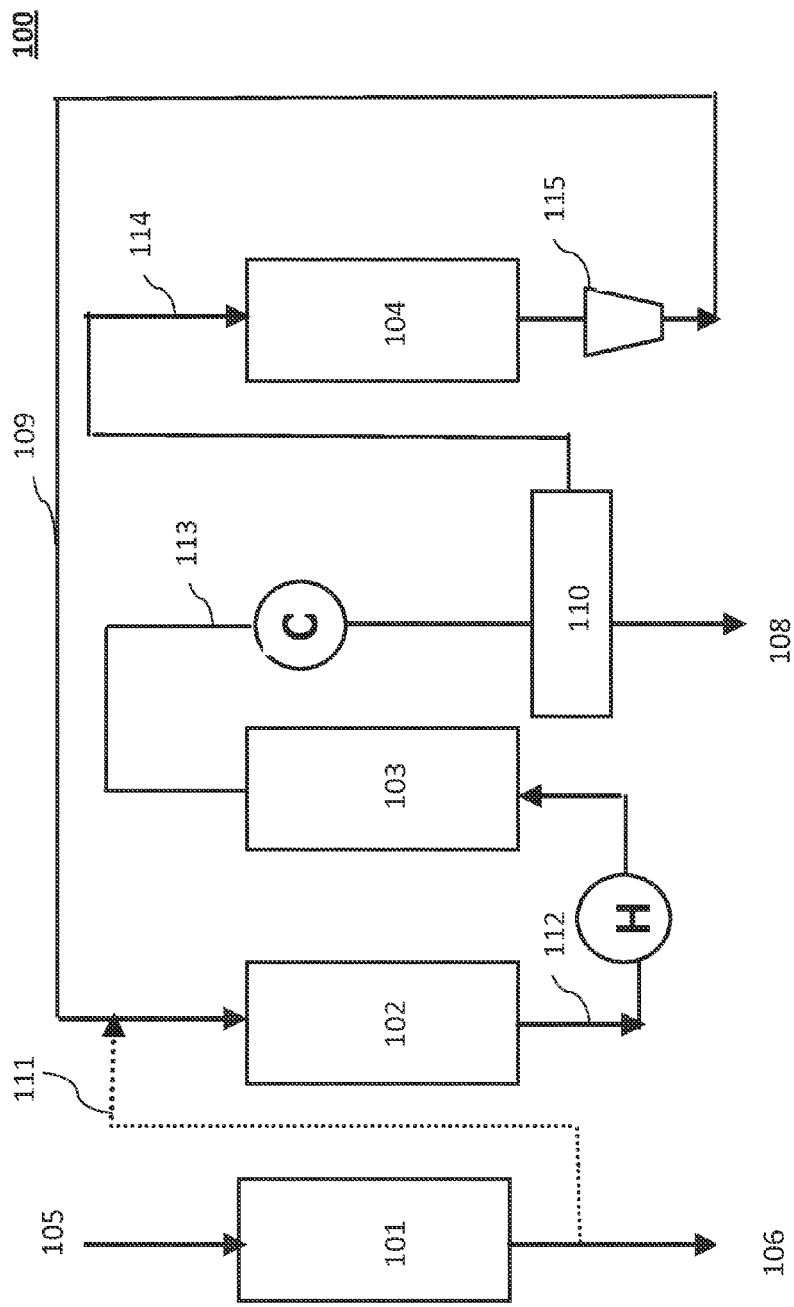
FIG. 2 is a process flow diagram illustrating a method implemented on a temperature swing adsorption system in accordance with various embodiments of the present disclosure.

With reference now to FIG. 2, an exemplary process diagram is illustrated for a TSA system 100 provided in accordance with an embodiment of the present disclosure. The TSA system includes first, second, third, and fourth adsorption beds 101, 102, 103, and 104, which are provided with an adsorbent material in the manner as described above with regard to FIG. 1 (i.e., beds 1 through 3). The system 100 further includes a heater (H), a cooler (C), a separation system 110, and a blower 115. The separation system 110 can include any type of gas/gas, liquid/gas, membrane, condensation, or other separation system known in the art. Heater (H), cooler (C), and blower 115 can be selected from any conventional design, the size and configuration of which is dependent upon the size and operation of the system 100, as will be understood by those of skill in the art. In some embodiments, the blower 115 may be located on stream 109 as shown in FIG. 2, or may be located on stream 114, or before the separation system 110.

Reference is now made to the operation of the system 100, as depicted in FIG. 2, and with further reference to the first sub-cycle column of Table 1, provided below, which sets forth the sequence of the various sub-cycles used in the TSA process. Referring to the adsorption bed 101 in FIG. 2, which is referred to as "Adsorber 1" in Table 1, the feed gas 105 first goes through the adsorption step ("A") and generates a product stream 106. A small "makeup" stream 111 for the regeneration stream is also provided from stream 106.

The adsorption bed 102 (referred to as "Adsorber 2" in Table 1) in a cooling step ("C"), is cooled by the effluent gas 109 from the adsorption bed 104 undergoing a rinse step, as will be described below. In a subsequent heating step ("H"), the adsorption bed 103 (referred to as "Adsorber 3" in Table 1) is heated by the effluent gas 112 from the adsorption bed 102 undergoing the cooling step ("C"), as shown in FIG. 2. Heat is provided to the stream 112 by means of the heater (H).

The effluent stream 113 from the adsorption bed 103 is cooled in the cooler (C), and is then provided to the separation system 110. A separation stream 108, which can be a condensate, permeate, etc., depending on the type of separation system employed, is removed from the system. The remaining stream 114 from the separation system 110, which can be an overhead, residual, etc., is then provided to the adsorption bed 104.

In the rinse step (R), with reference to adsorption bed 104 (referred to as "Adsorber 4" in Table 1), stream 114 after separation system 110 is sent to the inlet end of the adsorption bed 104 to enrich the adsorptive concentration. The gas stream 109 from the outlet of the adsorber 104 in the rinse step is recycled back and used to cool the adsorption bed 102 in the cooling step (C). The blower 115 is provided to boost the pressure so that the gas recycle is feasible.

The adsorption beds 101, 102, 103, and 104 cycle between the adsorption step ("A"), the cooling step ("C"), the heating step ("H"), and the rinsing step ("R"), as set forth in Table 1. Table 1 shows the sequence of the TSA steps for each adsorption bed for each sub-cycle. Following the "Adsorber 1" in Table 1 (referring now to row 1 of Table 1), the feed gas first goes through the adsorption step ("A") and generates a product stream. In the second step, or the rinse step ("R"), the cooled regeneration gas after the separation system 110 is sent to the inlet end of the adsorber to enrich the adsorptive concentration. The gas from the outlet of the adsorber in the rinse step is used to cool the adsorber that has just completed the hot regeneration step or "Adsorber 3" in the table. In the third step ("H"), the adsorber is heated by the effluent gas from the cooling adsorber ("Adsorber 4"). In the fourth step ("C"), the adsorber is cooled by the effluent gas from "Adsorber 3" undergoing the rinse step. This completes the cycle and the sequence repeats itself

TABLE 1

|  | Subcycle | | | |
|---|---|---|---|---|
| Adsorber 1 | A | R | H | C |
| Adsorber 2 | C | A | R | H |
| Adsorber 3 | H | C | A | R |
| Adsorber 4 | R | H | C | A |
| time | t | t | t | t |

A: Adsorption,
H: Heat,
C: Cool,
R: Rinse

As the regeneration gas returns to the feed in prior art systems, the overall feed to the adsorbers is increased. Moreover, if only a limited amount of the feed contaminants are removed after cooling and gas-liquid separation, the feed contaminant concentrations can increase beyond the original feed. This is the case for the TSA process to remove hydrocarbons from a natural gas stream to produce C5+<0.1%, as C5, C6 or even C7 are difficult to condense at a temperature above the hydrate formation temperature. In contrast, in accordance with the described embodiments, the regeneration effluent gas, after liquid are removed in the cooler and separator, is used to rinse another adsorber to increase its adsorption loading. The outlet of this adsorber is used to supply the cooling/heating or the regeneration gas. The increased adsorption loading during the rinse step results in a higher regeneration gas effluent contaminant concentration. This allows for more efficient removal of contaminants from the regeneration effluent gas which can result in a significant reduction of the adsorber size.

Figure 3:
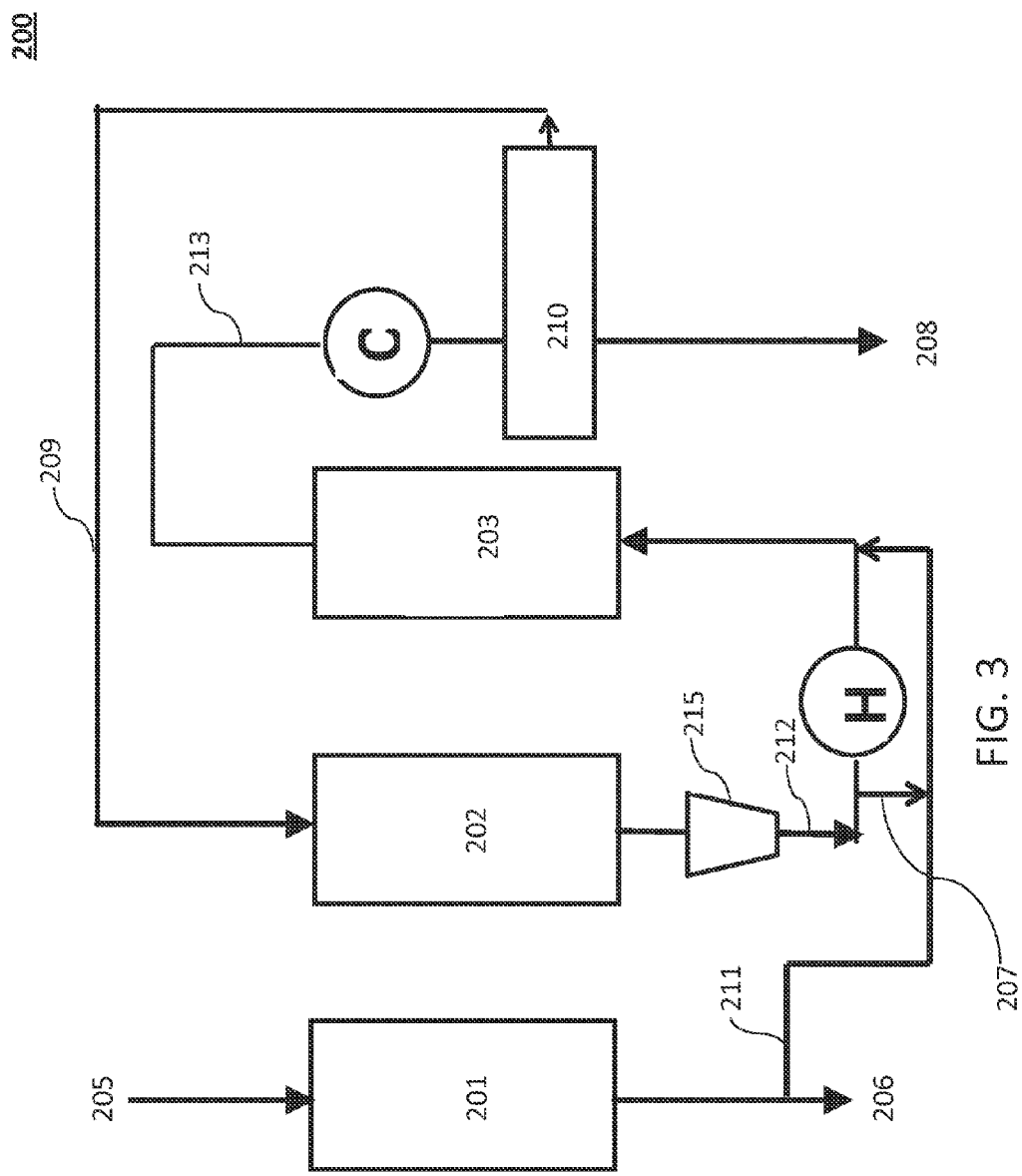
FIG. 3 is a process flow diagram illustrating another method implemented on a temperature swing adsorption system in accordance with various alternative embodiments of the present disclosure.

An alternative embodiment of the present disclosure is presented in connection with the exemplary TSA system diagram 200 illustrated in FIG. 3. As shown therein, the TSA system 200 includes first, second, and third (but not fourth) adsorption beds 201, 202, and 203, which are provided with an adsorbent material in the manner as described above with regard to TSA system 100 shown in FIG. 2. The system 200, like system 100, further includes a heater (H), a cooler (C), a separation system 210, and a blower 215. The separation system 210 can include any type of gag/gas, liquid/gas, membrane, condensation, or other separation system known in the art. Heater (H), cooler (C), and blower 215 can be selected from any conventional design, the size and configuration of which is dependent upon the size and operation of the system 200, as will be understood by those of skill in the art. In some embodiments, the blower 215 may be located on stream 212 as shown in FIG. 3, or may be located in the stream 209, or before the separation system 210. Streams 207 and 211 are provided for regeneration cooling purposes. For convenience, it is noted that the streams 211 through 214 are labeled similarly in FIG. 3 as in FIG. 2, with the stream numbers being incremented by 100. As such, the composition of each stream need not be repeated herein.

The adsorption beds 201, 202, and 203 cycle between the adsorption step ("A"), the cooling step ("C"), the heating step ("H"), and the rinsing step ("R"), as set forth in Table 2. Since there are four steps being performed on three adsorption beds, the steps are divided into three subcycles ("subcycle 1", "subcycle 2", and "subcycle 3"), with each subcycle included three steps to be performed. Table 2 shows the sequence of the TSA steps for each adsorption bed for each sub-cycle. Following the "Adsorber 1" in Table 1 (referring now to row 1 of Table 1), the feed gas first goes through the adsorption step ("A") and generates a product stream. In the second step, or the rinse step ("R"), the cooled regeneration gas after the separation system 210 is sent to the inlet end of the adsorber to enrich the adsorptive concentration. The gas from the outlet of the adsorber in the rinse step is used to heat the adsorber that is undergoing the hot regeneration step or "Adsorber 2" in the table. After this substep, the gas from the outlet of the adsorber in the rinse step is used to cool the same adsorber that has just completed the hot regeneration step or "Adsorber 2" in the table. In the third step ("H"), the adsorber is initially heated by the effluent gas from the cooling adsorber or "Adsorber 2" and then by the effluent gas from the rinse step, or "Adsorber 3". In the fourth step ("C"), the adsorber is first cooled by the effluent gas from "Adsorber 3" undergoing the rinse step, then followed by a portion of the product gas generated by "Adsorber 2" in the table. The process continues through each subcycle 1, 2, 3, as shown in Table 2, with each of the four steps, "A", "R", "H", and "C", being performed on each of the three adsorbers, in turn, in the sequence indicated.

TABLE 2

|  | Subcycle 1 | | | Subcycle 2 | | | Subcycle 3 | | |
| --- | --- | --- | --- | --- | --- | --- | --- | --- | --- |
| Adsorber 1 | A | A | A | R | R | H | H | C | C |
| Adsorber 2 | R | R | H | H | C | C | A | A | A |
| Adsorber 3 | H | C | C | A | A | A | R | R | H |
| time | t1 | t2 | t3 | t1 | t2 | t3 | t1 | t2 | t3 |

A: Adsorption,
H: Heat,
C: Cool,
R: Rinse

ILLUSTRATIVE EXAMPLES

The present disclosure is now illustrated by the following non-limiting examples. It should be noted that various changes and modifications can be applied to the following example and processes without departing from the scope of this invention, which is defined in the appended claims. Therefore, it should be noted that the following example should be interpreted as illustrative only and not limiting in any sense.

TABLE 3

|  |  | Example 1 | | Example 2 | | Example 3 | |
| --- | --- | --- | --- | --- | --- | --- | --- |
|  |  | Feed | Product | Feed | Product | Feed | Product |
| Nitrogen | Mol % | 1.19 | <4 | 0.1592 |  | 0.319 |  |
| CO2 | Mol % | 1.32 | <2 | 0.0050 |  | 0.005 |  |
| Ethane | Mol % | 2.54 | <10 | 0.1801 |  | 2.28 |  |
| Propane | Mol % | 0.13 | <1 | 0.0995 |  | 0.751 |  |
| Butane | Mol % | 0.032 | <1 | 0.0647 |  | 0.372 |  |
| Pentane | Mol % | 0.0073 | <0.08 | 0.0468 |  | 0.105 |  |
| Neopentane | ppm | 10 | <1 | 100 | <0.4 | 23 | <1 |
| Cyclopentane | ppm | 0 |  | 139 | <0.6 | 91 |  |
| Benzene/BTX | ppm | 10 | <1 | 160 | <0.7 | 112 | <1 |
| Cyclohexane | ppm | 10 | <1 | 149 | <0.6 | 115 | <1 |
| n-Hexane+ | ppm | 227 | <1 | 975 | <4 | 1350 | <1 |
| H2O | ppm | 90 | <90 | Sat. | <0.1 | Sat. | <0.1 |

Example 1

A natural gas stream at a flow rate of 236 MMSCFD at 65 bar ($6.5 \times 10^6$ Pa) and 38° C. with a composition shown in Table 3 is to have hydrocarbon removed to the product specification as shown in the same Table. Layered bed adsorbers packed with 33% of silica gel adsorbent on the top and 67% of NaX at the bottom are used to remove water and hydrocarbons using TSA processes. Both the prior art cycle shown in FIG. 1 and the cycle in accordance with the present disclosure shown in FIG. 2 are compared using the process simulator, Aspen Adsim™. The results are summarized in Table 4.

Example 2

A natural gas stream at a flow rate of 239 million standard cubic feet per day (MMSCFD) at 59 bar ($5.9 \times 10^6$ Pa) and 27° C. with a composition shown in Table 3 is to have hydrocarbons removed to the product specification as shown in the same Table. Layered bed adsorbers packed with 32% of silica gel adsorbent on the top and 68% of NaX at the bottom are used to remove water and hydrocarbons using TSA processes. Both the prior art cycle shown in FIG. 1 and the cycle in accordance with the present disclosure shown in FIG. 2 are compared using the process simulator, Aspen Adsim™. The results are summarized in Table 4.

Example 3

A natural gas stream at a flow rate of 300 MMSCFD at 59 bar ($5.9 \times 10^6$ Pa) and 33° C. with a composition shown in Table 3 is to have hydrocarbons removed to the product specification as shown in the same Table. Layered bed adsorbers packed with 97% of silica gel adsorbent on the top and 3% of NaX at the bottom are used to remove water and hydrocarbons using TSA processes. Both the prior art cycle shown in FIG. 1 and the cycle in accordance with the present disclosure shown in FIG. 2 are compared using the process simulator, Aspen Adsim™. The results are summarized in Table 4.

TABLE 4

|  |  | feed, mmscfd | reg, mmscfd | No beds | relative sorbent vol/bed | relative total sorbent |
|---|---|---|---|---|---|---|
| example 1 | prior art | 236 | 62 | 4 | 1 | 4 |
|  | present disclosure | 236 | 36 | 5 | 0.56 | 2.78 |
| example 2 | prior art | 239 | 91 | 4 | 1 | 4 |
|  | present disclosure | 239 | 50 | 5 | 0.46 | 2.31 |
| example 3 | prior art | 300 | 89 | 4 | 1 | 4 |
|  | present disclosure | 300 | 54 | 5 | 0.61 | 3.04 |

As can be seen from the Table 3, each adsorber size is reduced quite significantly based on the current embodiments described herein. The total amounts of the adsorbents are actually decreased. The adsorber sizes are also reduced accordingly. As each adsorber size is reduced, the required regeneration flow is decreased, which contributes significantly to the reduction of the regeneration equipment size. The net results are a reduction of the overall capital costs. The smaller regeneration flows reduce the heating, cooling and the blower duties, which, in combination with the lower replacement cost for the adsorbents, reduce the annual operating cost.

As such, embodiments of the present disclosure provide improved temperature swing adsorption systems and method for operating the same. The described embodiments allow for an increase in the adsorbent overall loadings, an increase in the strong adsorptive component concentrations in the regeneration gas, an increase in the removal efficiency of the contaminant compounds from the regeneration gas stream, e.g. liquid condensation, a reduction the adsorbent bed size, and a reduction in the regeneration flow.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the processes without departing from the scope defined by the claims, which includes known equivalents and foreseeable equivalents at the time of this disclosure.

What is claimed is:

1. A temperature swing adsorption system comprising:
    a first adsorption bed configured to receive a feed stream and adsorb a contaminant from the feed stream to produce a product stream;
    a second adsorption bed configured to receive a cooling stream to reduce a temperature of the second adsorption bed;
    a heater configured to receive the portion of the product stream from the second adsorption bed and to increase a temperature of the portion of the product stream to generate a heated product stream;
    a third adsorption bed configured to receive the heated product stream to increase a temperature of the third adsorption bed;
    a cooler configured to receive the heated product stream from the third adsorption bed and to decrease a temperature of the heated product stream to generate a cooled product stream;
    a separation system to separate the cooled product stream into a first component stream and a second component stream; and
    a fourth adsorption bed configured to receive the first component stream, wherein the product stream of the fourth adsorption bed is directed to the second adsorption bed to provide the cooling stream.

2. The temperature swing adsorption system of claim 1, wherein:
    the second adsorption bed is further configured to receive a feed stream and adsorb a contaminant from the feed stream to produce a product stream;
    the third adsorption bed is further configured to receive a cooling stream to reduce a temperature of the third adsorption bed;
    the fourth adsorption bed is further configured to receive the heated product stream to increase a temperature of the fourth adsorption bed; and
    the first adsorption bed is further configured to receive the first component stream and to enrich an adsorptive concentration of the first adsorption bed.

3. The temperature swing adsorption system of claim 1, wherein:
    the third adsorption bed is further configured to receive a feed stream and adsorb a contaminant from the feed stream to produce a product stream;
    the fourth adsorption bed is further configured to receive a cooling stream to reduce a temperature of the fourth adsorption bed;
    the first adsorption bed is further configured to receive the heated product stream to increase a temperature of the first adsorption bed; and
    the second adsorption bed is further configured to receive the first component stream and to enrich an adsorptive concentration of the second adsorption bed.

4. The temperature swing adsorption system of claim 1, wherein:
    the fourth adsorption bed is further configured to receive a feed stream and adsorb a contaminant from the feed stream to produce a product stream;
    the first adsorption bed is further configured to receive a cooling stream to reduce a temperature of the first adsorption bed;
    the second adsorption bed is further configured to receive the heated product stream to increase a temperature of the second adsorption bed; and
    the third adsorption bed is further configured to receive the first component stream and to enrich an adsorptive concentration of the third adsorption bed.

5. The apparatus of claim 1, further comprising a blower configured to increase a pressure of the enriched first component stream.

6. The apparatus of claim 1, wherein the separation system is configured to produce an overhead stream and a condensate stream.

7. The apparatus of claim 1, wherein the separation system is configured to produce a permeate stream and a residue stream.

8. The apparatus of claim 1, wherein an adsorbent in at least one of the adsorption beds is a silica gel, molecular sieve, alumina, activated carbon, mixed oxide adsorbent, or combinations thereof.

9. The apparatus of claim 8, wherein the adsorbent in the at least one of the adsorption beds is a silica gel.

10. The apparatus of claim 1, wherein the first adsorption bed is configured to receive a natural gas feed stream.

11. A temperature swing adsorption method comprising the following steps:
   (a) sending a feed stream into an adsorption bed and adsorbing a contaminant from the feed stream into the adsorption bed to produce a product stream;
   (b) (1) sending a treated regeneration gas stream into the adsorption bed to enrich an adsorptive concentration in the adsorption bed; and
      (2) optionally providing a regeneration gas stream from the product stream of the adsorption bed for use in a subsequent step (c)(1) for increasing a temperature of a further adsorption bed; and
      (3) optionally providing a regeneration cooling stream from the product stream of the adsorption bed for use in a subsequent step (d) for cooling a further adsorption bed, wherein either or both of steps (b)(2) and (b)(3) are performed;
   (c) (1) sending a heated regeneration gas stream into the adsorption bed to increase a temperature of the adsorption bed and produce a heated product stream;
      (2) sending the heated product stream from the adsorption bed into a cooler to decrease a temperature of the heated product stream to generate a cooled product stream; and
      (3) separating the cooled product stream in a separation system into a treated regeneration gas stream and a contaminant-enriched stream, wherein the treated regeneration gas stream provides the treated regeneration gas stream of step (b)(1); and
   (d) sending the regeneration cooling gas stream into the further adsorption bed to reduce a temperature of the further adsorption bed.

12. The method of claim 11, wherein adsorbing the contaminant from the feed stream comprises adsorbing the contaminant into a silicon gel adsorbent.

13. The method of claim 11, further comprising increasing a pressure of the contaminant-enriched stream.

14. The method of claim 11, wherein separating the cooled product stream comprises separating the cooled product stream into an overhead stream and a condensate stream.

15. The method of claim 11, wherein separating the cooled product stream comprises separating the cooled product stream into a permeate stream and a residual stream.

16. The method of claim 11, wherein receiving the feed stream comprises receiving a natural gas stream.

17. A temperature swing adsorption system comprising:
   a first adsorption bed configured to receive a natural gas feed stream and adsorb a contaminant from the feed stream to produce a product stream;
   a second adsorption bed configured to receive a cooling stream to reduce a temperature of the second adsorption bed;
   a heater configured to receive the portion of the product stream from the second adsorption bed and to increase a temperature of the portion of the product stream to generate a heated product stream;
   a third adsorption bed configured to receive the heated product stream to increase a temperature of the third adsorption bed;
   a cooler configured to receive the heated product stream from the third adsorption bed and further configured to decrease a temperature of the heated product stream to generate a cooled product stream;
   a liquid/gas separation system to separate the cooled product stream into a first component stream comprising an overhead stream and a second component stream comprising a condensate stream;
   a fourth adsorption bed configured to receive the first component stream and to enrich an adsorptive concentration of the fourth adsorption bed; and
   a blower configured to increase of pressure of the enriched first component, wherein the enriched first component stream is directed to the second adsorption bed to provide the cooling stream, and wherein each of the first, second, third, and fourth adsorption beds comprises a silica adsorbent gel.

18. The temperature swing adsorption system of claim 17, wherein the gas feed stream is received at a temperature from about 15° C. to about 50° C.

19. The temperature swing adsorption system of claim 17, wherein the product stream comprises less than about 0.1% by molecular species $C_5+$ hydrocarbons.

20. The temperature swing adsorption system of claim 17, wherein the heater is selected from the group consisting of: an electric heater, a steam heater, a fired heater, and a hot oil heater.

* * * * *